Sept. 29, 1964 J. K. GRIFFITH 3,150,830
APPARATUS FOR IRRIGATION
Filed Aug. 24, 1962 2 Sheets-Sheet 1

INVENTOR
JESSIE K. GRIFFITH
BY Shoemaker and Mattare
ATTORNEYS

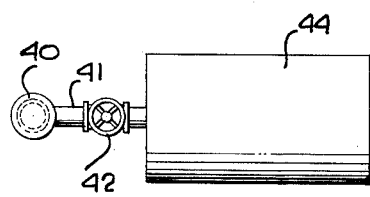
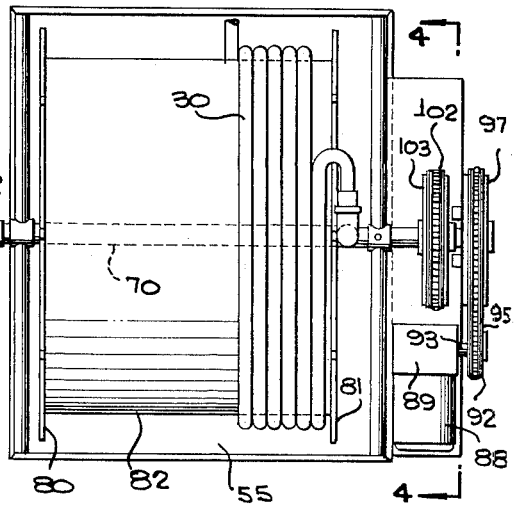
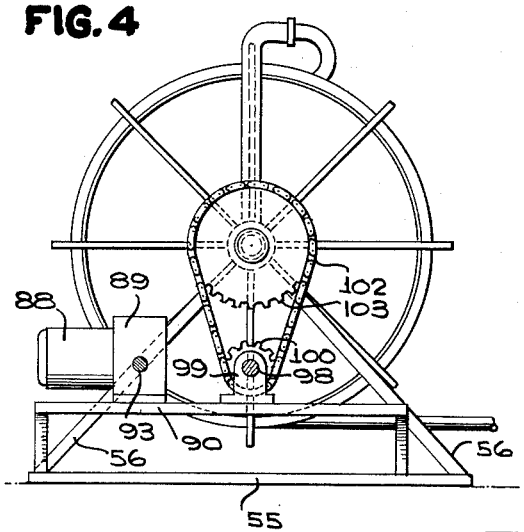
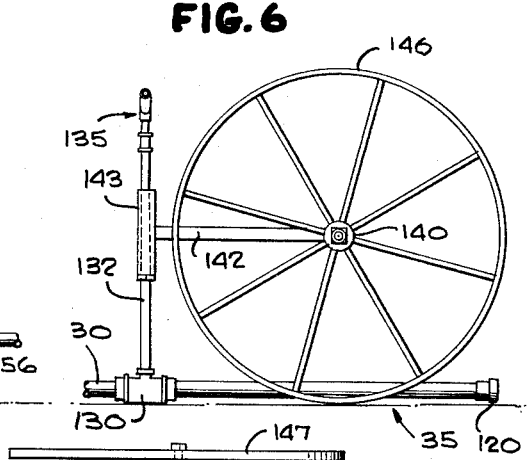
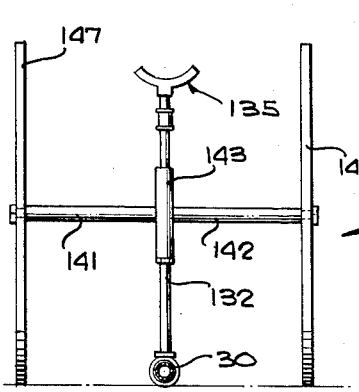

United States Patent Office 3,150,830
Patented Sept. 29, 1964

3,150,830
APPARATUS FOR IRRIGATION
Jessie K. Griffith, Star Rte. 2, Morton, Tex.
Filed Aug. 24, 1962, Ser. No. 219,167
5 Claims. (Cl. 239—198)

The present invention relates to a new and novel apparatus and method for irrigation, and more particularly to an irrigation system which is completely automatic in operation.

The present invention is particularly directed to the problem of irrigating relatively large areas such as cultivated fields which may cover an area of many acres.

It is a difficult problem to obtain uniform and thorough irrigation of such large areas, and the present invention contemplates a means for advancing one or more sprinklers in a certain manner over large areas so as to obtain the desired end results.

It is a further purpose of the invention to provide an irrigation system which is completely automatic in operation and which can be utilized for irrigating large areas without requiring the attention of any personnel during the operation thereof thereby freeing such personnel for other duties.

In order to cover the wide areas according to the present invention, an elongated flexible hose is employed to which one or more sprinklers is connected, and reel means is provided for winding up the hose. A plurality of such hoses may be employed, where a large field is to be covered, and in such a case the sprinklers attached to the various hoses may be advanced substantially simultaneously along substantially parallel paths toward a central area.

In order to provide completely automatic operation, driving means is provided for the reel, this driving means including a power driven means which is controlled by means of an automatic timer, the timer serving to actuate the power driving means at predetermined intervals.

With the arrangement of the present invention, it is merely necessary to first unwind the flexible hoses to the desired extent to position the sprinklers in their initial positions, whereupon actuation of the system will cause each of the sprinklers to be automatically advanced as desired.

It is evident that the automatic timer can be set so as to advance the sprinklers a predetermined distance each time the power driven means is actuated, and further to allow the sprinklers to remain in a given location a sufficient length of time so as to suitably saturate the ground in the vicinity of the sprinklers.

A unique wheeled support means is provided for supporting and maintaining the sprinklers in operative position such that the sprinklers will at all times operate in the most efficient and effective manner so as to obtain optimum distribution of water adjacent thereto.

An object of the present invention is to provide a new and novel apparatus and method for irrigation which is completely automatic in operation.

A further object of the invention is the provision of an apparatus and method for irrigation which is particularly suitable for irrigating large areas.

A further object of the invention is to provide irrigation apparatus which is quite simple and inexpensive in construction and which is quite efficient and reliable in operation.

Other objects and many attendant advantages of the invention will become more apparent when considered in connection with the specification and accompanying drawings, wherein:

FIG. 3 is a plan view of the structure illustrated in FIG. 2;

FIG. 4 is a sectional view taken substantially along line 4—4 of FIG. 3 looking in the direction of the arrows;

FIG. 6 is a side view of the wheeled support means for the water distribution means;

FIG. 7 is a front elevation of the support means shown in FIG. 6; and

FIG. 8 is a top view of the structure shown in FIG. 6.

Figure 1:
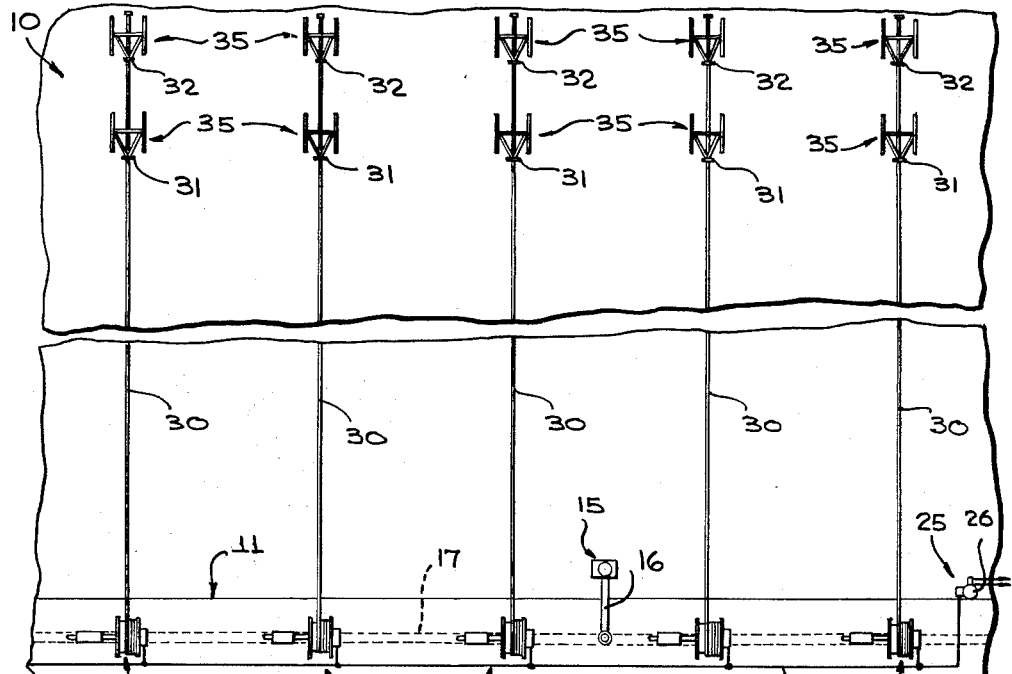
FIG. 1 is a plan view of a portion of a field to be irrigated illustrating the arrangement according to the present invention.

Referring now to the drawings wherein like reference characters designate corresponding parts throughout the several views, there is shown a cultivated field or similar area indicated generally by reference numeral 10 having a central portion indicated generally by reference numeral 11, it being understood that for the purpose of description, only substantially one-half of the area to be irrigated is shown, the other half of the field having only the innermost portion 12 thereof illustrated, it being understood that the area of irrigation will extend substantially equally on either side of the central portion 11 of the field.

An irrigation well is indicated by reference numeral 15, this irrigation well being connected by means of a conduit 16 to an underground conduit 17 which serves as a common supply for the various water distribution devices hereinafter described. It will be understood that the field may extend a considerable distance in each direction from that shown, only a limited area being shown for the purpose of illustration.

As shown, five reel means indicated generally by reference numerals 20 are illustrated, each of these reel means having the driving means thereof as hereinafter described operatively connected with common wiring indicated schematically by reference numeral 22 which in turn is connected to a switch and timer mechanism indicated generally by reference numeral 25, which is mounted on a suitable utility pole 26. As illustrated, five of the reel mechanisms have been shown as all being controlled by the same timer mechanism, this number being purely arbitrary and it being understood that any number of reels may be controlled by a single timer if desired.

It will be noted that extending outwardly from each of the reel mechanisms 20 is a flexible hose 30, each of these hoses being shown as having connected thereto a pair of sprinklers 31 and 32, it being noted that any number of sprinklers may be connected to the flexible hose in accordance with the requirements for any given situation.

Each of the sprinklers is supported and maintained in operative position by means of a wheeled support means indicated generally by reference numeral 35, the details of construction being hereinafter more fully described.

Figure 2:
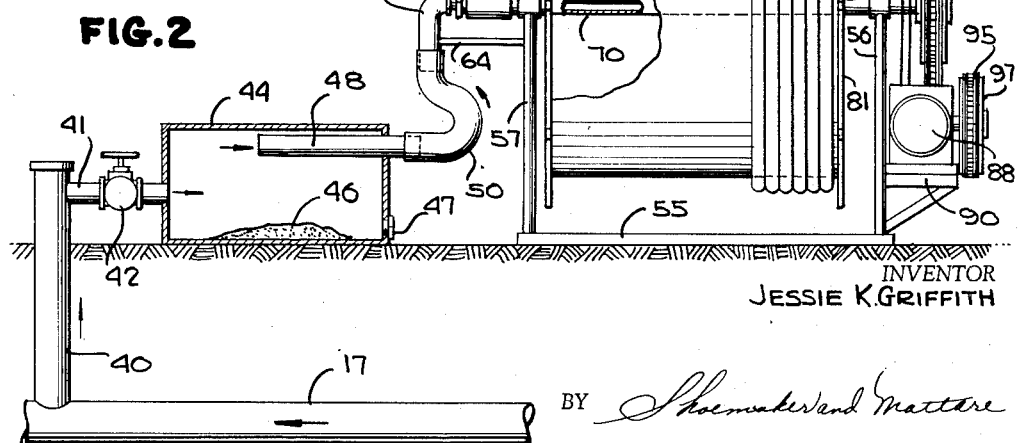
FIG. 2 is a view partly in section and partially broken away illustrating the reel means and the associated water supply.

Referring now to FIGS. 2 and 3, the details of construction of each reel mechanism may be more clearly understood, it being clearly understood that the construction of each of the reel mechanisms is substantially identical and accordingly, a description of one of the reel mechanisms will suffice for all.

The underground conduit 17 is connected with a riser 40 which in turn supplies water to a pipe 41 having a manually controllable valve 42 connected therein. Pipe 41 leads into the interior of a filter unit 44, this filter unit having a body of sand 46 therein and being provided with a drain plug 47. A pipe 48 provides an outlet from the filter means 44 and is connected with flexible tubing 50.

A frame for supporting the reel means includes a base member 55 which is adapted to rest upon the ground, this base member supporting upwardly and inwardly extending support members 56 at one end thereof and 57 at the other end thereof, members 56 defining with the base a triangular configuration and supporting at their apexes a bearing support 60 for the reel means while members 57 similarly support a bearing support means 61.

Figure 5:
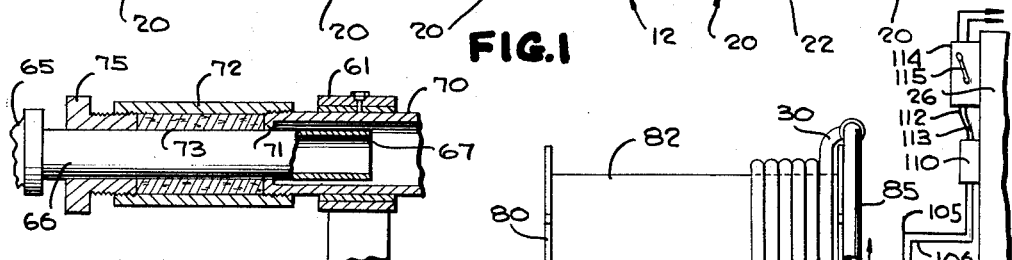
FIG. 5 is an enlarged longitudinal section through the hydraulic coupling means of the invention.

A bracket 64 extends laterally from members 57 and supports a stationary elbow 65 to the lower end of which is connected flexible tube 50. A pipe 66 is connected with the upper end of elbow 65 and as seen in FIG. 5, this pipe has an open end 67 which is disposed within the hollow central longitudinally extending conduit 70 of the reel means, conduit 70 being rotatably supported within bearing support members 60 and 61 previously described.

It will be understood that pipe 67 is stationary while conduit means 70 is rotatable and includes an inwardly extending annular flange 71 at the outer end thereof which fits about pipe 67. A sleeve 72 is threaded on the threaded outer end of conduit portion 70 and a seal packing 73 is disposed inwardly of sleeve 72. An adjusting nut 75 is threaded within the outer threaded end portion of sleeve 72 as shown, the adjusting nut serving to compress the packing 73 as required to ensure a fluid-tight seal with the outer surface of pipe 67 as will be well understood.

A reel means comprises a first plurality of radially extending spoke members 80 and a second plurality of radially extending spoke members 81 between which is mounted a cylindrical member 82, these spoke members being suitably secured to conduit member 70 as by welding or the like while the cylindrical member 82 may be welded at the opposite ends thereof to the spoke members 80 and 81. The spoke members 80 and 81 extend radially outwardly of the cylindrical member 82 so as to prevent the flexible hose wound on cylindrical member 82 from slipping off the ends of the cylindrical member.

A radially extending conduit 85 has the inner end thereof secured to conduit member 70 and is in communication therewith for conducting the water from conduit member 70 outwardly to the hose 30 which has one end thereof secured to the outer end of conduit 85.

The driving means for the reel means includes a motor 88 and a gear reducer 89 which are mounted on a suitable bracket 90 secured to the support frame, gear reducer 89 in turn having a gear 92 secured to the output shaft 93 thereof. A first drive chain 95 drivingly connects gear 92 with a gear 97 which is fixed to a shaft 98 journalled in a support member 99 supported on bracket 90.

A gear 100 is also fixed to shaft 98 and is connected through a driving chain 102 with a gear 103 fixed to the outer end of the conduit member 70. It is apparent that driving motor 88 when actuated will serve to rotate the reel means at a predetermined rate.

The wiring indicated schematically by reference numeral 22 in FIG. 1 includes a pair of wires 105 and 106 which are connected to a timer 110. This timer may be of conventional construction and preferably comprises an adjustable automatic time clock which can be set so as to energize and de-energize the motor at predetermined time intervals.

This timer 110 is in turn connected by a pair of wires 112 and 113 to a switch box 114 having a handle 115 which is adapted to connect and disconnect the apparatus in a power supply line. As shown, it is contemplated that A.C. current will be available for operating the electric A.C. motor 88. If such is not available, however, a D.C. motor may be utilized in combination with a portable D.C. generator.

Referring now to FIGS. 6-8, it will be seen that flexible hoses 30 may be provided with a cap 120 which is secured to the outer end thereof. A fitting 121 is connected in hose 30, this fitting supporting a riser 132 having a sprinkler 135 of conventional construction secured to the upper end thereof, this sprinkler preferably being of the type which automatically rotates under the influence of water pressure passing therethrough in a well-understood manner.

The wheel support means 35 each include a framework comprising an axle member 140 to which are connected two converging frame members 141 and 142 which support at the apex thereof a tubular member 143, all of these frame members being preferably secured to one another as by welding or the like to provide a rigid frame work. Riser 132 extends upwardly through the hollow bore provided in tubular member 143. Riser 132 preferably fits snugly within tubular member 143 and may either be slidably disposed therewithin or suitably fixed therewithin if desired.

A pair of wheels 146 and 147 are rotatably supported at the opposite ends of axle member 140, and it will be seen from an inspection of FIGS. 6 and 7 that the over-all arrangement is such that wheels 146 will readily permit the water distribution means in the form of the sprinkler mechanism to be moved along relative to the ground while at the same time serving to properly position the sprinkler means so that the riser extends substantially vertically upwardly at all times. It is apparent that the wheeled support means 35 will prevent the sprinkler from tipping over and falling to the ground and will ensure that it is in its upright proper operative position throughout movement of the sprinkler means toward the reel means during operation.

Not only does the wheeled support means ensure that the sprinkler means is in operative position at all times, but the guide wheels 146 and 147 ensure that the hose and the associated sprinklers will properly track along substantially straight lines as the reel tends to move these components inwardly when driven.

In operation, water is normally supplied from the underground conduit through pipe 41 to the filter means 44, thence through pipe 48, tube 50, elbow 65, pipe 66, conduit 70 and conduit 85 to the hose 30 from whence the water is distributed to the sprinklers 135. The sprinklers and the wheeled support means are initially positioned remotely from the reels as shown in FIG. 1, and upon initiation of the system, the automatic timer 110 will cause the driving motor 88 to periodically rotate the reel and reel in the hose and the movable support means.

While this is occurring, water is constantly being distributed over the entire area as will be clear from the foregoing discussion. When the sprinklers have been moved inwardly to a point adjacent the central portion of the field, the wheeled support means will then be moved on the opposite sides of the central portion of the field from that shown, and the flexible hose unwound from the reel until the sprinklers will again be spaced the desired distance from the central portion of the field whereupon the system can again be initiated to automatically move the sprinklers inwardly as aforedescribed. To give an idea of the area which may be covered with such a system, the length of the hose when unreeled may be up to 1500 feet, while the flexible hoses and their associated reels may be spaced from 50 to 75 feet from one another depending on the water pressure and size of the sprinklers.

It is noted that when carrying out the method of the present invention, a multiplicity of sprinklers can be advanced substantially simultaneously along substantially parallel paths, the sprinklers being advanced in an intermittent manner so as to completely irrigate a very large area.

It is apparent from the foregoing that there is provided new and novel apparatus and method for irrigation which is completely automatic in operation and which is especially suitable for irrigating very large areas. The apparatus is quite simple and inexpensive in construction and yet is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Irrigation apparatus comprising frame means, a reel rotatably supported by said frame means, said reel including a central longitudinally extending conduit, means for supplying water to said longitudinally extending conduit, said reel means including a radially extending conduit in communication with said longitudinally extending conduit, a flexible hose having one end portion thereof connected with said radially extending conduit for receiving water therefrom, power driving means operatively connected with said reel means for rotating said reel means, and automatic timer means operatively connected with said power driving means for initiating and terminating operation of said power driving means so as to drive said reel means at a predetermined speed and at predetermined time intervals, sprinkler means connected with said flexible hose for distributing water passing through said hose, and support means operatively associated with said sprinkler means for supporting and maintaining said sprinkler means in operative position, said support means including a framework supported on a plurality of wheels for ready movement over the ground.

2. Apparatus as defined in claim 1, wherein said means for supplying water to said longitudinally extending conduit includes means for filtering out foreign matter from water fed through the apparatus to said sprinkler means.

3. Apparatus as defined in claim 1, wherein said means for supplying water to said longitudinally extending conduit includes a fixed conduit means operatively connected with said longitudinally extending conduit by means of a hydraulic coupling means.

4. Apparatus as defined in claim 1, wherein said sprinkler means is supported at the upper end of a sprinkler riser, the lower end of which is operatively connected to said flexible hose, the framework of said support means engaging and supporting a portion of said riser.

5. Irrigation apparatus comprising a frame including a base member, upwardly extending support members being supported by said base member, bearing support means mounted at the upper ends of said support members, an elongated hollow conduit being rotatably supported in said bearing support means, pipe means for supplying water to the interior of said elongated conduit, and filter means connected in said pipe means for filtering all of the water passing through said pipe means into said conduit, reel means fixed to said conduit and including a substantially cylindrical central portion for supporting a flexible hose thereon, said reel means including members at the opposite ends thereof for limiting lateral movement of the hose supported on the central portion of the reel means, a radially extending conduit being hollow and being connected at its inner end with said first mentioned conduit, a flexible hose wrapped about the central portion of said reel means, one end of said flexible hose being connected with the outer end of said radially extending conduit for receiving water therefrom, power operated driving means drivingly connected with said first mentioned conduit for rotating said conduit and said reel means for wrapping said flexible hose about said reel means, timer means operatively connected with said driving means for energizing and de-energizing said driving means at predetermined time intervals, the opposite end of said flexible hose being connected with a fitting, a riser also being connected with said fitting and extending substantially vertically therefrom, a sprinkler secured to the upper end of said riser, a wheeled support means for supporting said riser, said wheeled support means including a framework including an axial member having a pair of wheels rotatably supported at opposite ends thereof, said framework including members extending laterally from said axle member toward said reel means and spaced above and substantially parallel with the ground, said laterally extending frame members including means at the outer ends thereof connected with said riser for supporting said riser in operative position such that the riser and the attached sprinkler can be moved along relative to the ground in proper position with the riser extending substantially vertically upwardly at all times.

References Cited in the file of this patent

UNITED STATES PATENTS

| 2,226,668 | Newman | Dec. 31, 1940 |
| 2,518,990 | Keener | Aug. 15, 1950 |
| 2,602,696 | Salatin | July 8, 1952 |
| 2,756,098 | Rottcher | July 24, 1956 |
| 2,801,132 | Shuck | July 30, 1957 |
| 2,880,948 | Leuenberger | June 9, 1959 |
| 2,918,800 | Ford | Dec. 29, 1959 |

FOREIGN PATENTS

| 338,880 | France | Mar. 1, 1903 |